Sept. 1, 1970  C. W. NEEFE  3,526,451

TRANSPARENT OCCLUDER CONTACT LENS

Filed May 10, 1968

Charles W. Neefe

United States Patent Office 3,526,451
Patented Sept. 1, 1970

3,526,451
TRANSPARENT OCCLUDER CONTACT LENS
Charles W. Neefe, Box 361, Big Spring, Tex. 79720
Filed May 10, 1968, Ser. No. 728,260
Int. Cl. G02c 7/04
U.S. Cl. 351—160      1 Claim

ABSTRACT OF THE DISCLOSURE

An occluder contact lens which by refraction reduces the wearer's visual acuity to below 20/400 and is cosmetically invisible on the eye.

---

It is sometimes beneficial to occlude vision from one eye. In cases involving strabismus it is often desirable to correct any anisometropia present and temporarily occlude the eye having the superior visual actuity. In this manner the existing brain pathways are exercised and new brain pathways are established resulting in improved visual acuity for the inferior eye. In many cases of prolonged cataract wherein the involvement is greater in one eye it is desirable after corrective surgery to temporarily occlude the nonaphakic eye and correct the resulting hyperopia in the aphakic eye with a contact lens.

Occluders are available for spectacle lenses employing ground or frosted glass. Occluder eyeglass lenses are made having a pebble or uneven finish of the rear surface which renders the eye visible through the occluder lens. Lenses of this type obviously cannot be adopted for use in contact lenses since it is necessary to have all surfaces of contact lenses polished and smooth. For contact lens occluders, black lenses or lenses with black pupil areas are employed. These lenses having black central areas are unsightly cosmetically and the fluorescein patterns cannot be viewed through the black plastic material. It is most desirable to see the fluorescein pattern to evaluate the physical fit of the posterior surface of the lens in relation to the cornea. This is accomplished by instilling a small quanity of sodium fluorescein in the eye and viewing the resulting pattern under ultraviolet illumination in a dark room. The lachrymal fluid will fluoresce brightest where the tear layer is thickest between the lens and cornea.

The herein disclosed occluder contact lens has a smooth and highly polished surface on both convex and concave surfaces. When in place upon the eye it is no more visible than a conventional lens of the same color. Cosmetically this lens is acceptable as any contact lens. Being transparent to the observer when in place upon the eye not only is the wearer's pupil and iris plainly visible but the fluorescein pattern may be readily observed and the physical fit evaluated.

An object of the present invention is to provide a refractive occluder contact lens having smooth highly polished surfaces.

Another object is to provide an occluder contact lens which is cosmetically acceptable and inconspicuous on the eye.

A further object is to provide an occluder contact lens through which the eye parts such as the pupil and iris are visible to the observer and through which the fluorescein patterns may be viewed.

Yet another object is to provide a lens which will reduce the visual acuity of the wearer to below 20/400.

These and other objects of the present invention will be fully apparent from the following description when taken in conjunction with the annexed drawing, in which.

Figure 1:
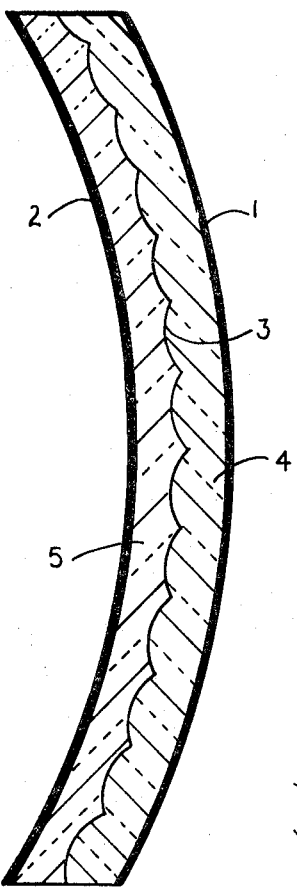
FIG. 1 is the lens shown in section.

The lens is constructed as follows: A block of plastic material such as methyl methacrylate is cut to a curve substantiality the same as the desired finished lens. As shown in FIG. 1, the surface 3 is formed of uniform, small, curved lenticulations extending over the entire area of the lens. An artifical resinous material 4, FIG. 1, having a higher refractive index is applied to the lens material 5, FIG. 1, and polymerized in situ. The concave surface 2, FIG. 1, and the convex surface 1, FIG. 1, are cut and polished to a radius concentric to the surface 3, FIG. 1, so that the lens is of substantially uniform thickness.

It is understood that a ground or pebble finish, as well as spiral or other disrupting patterns, may be employed. The ground finish is formed using a lap impregnated with coarse diamond grit.

Figure 2:
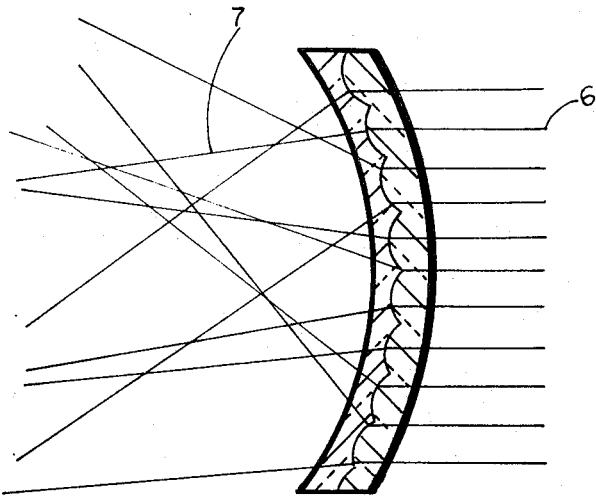
FIG. 2 is the lens in section showing incoming parallel light dispersed by the lens.

Parallel light 6, FIG. 2, entering the lens will be broken up into a random distribution resulting in the elimination of image formation within the eye.

Due to the close proximity of the iris and pupil to the lens only very slight degradation of the observed iris detail will occur.

The fluorescein pattern will be plainly visible since it is tangent to the rear surface of the lens.

Various modifications can be made without departing from the spirit of this invention or the scope of the appended claims. The constants set forth in this disclosure are given as examples and are in no way final or binding, accordingly, reference should be made to the appended claim, rather than to the foregoing specifications as indicating the scope of the invention.

I claim:

1. A transparent occluder contact lens to be worn on the cornea of the eye comprising:

a lens body having a smooth concave rear surface and a smooth convex front surface and of substantially uniform thickness, said lens body being formed of a transparent rear component and a transparent front component of higher refractive index intimately joined at an interface generally concentric to the front and rear lens surfaces, said interface being formed of a plurality of uniform, small, curved lenticulations extending over the entire area of the lens, said lenticulations acting by refraction to reduce the wearer's visual acuity to below approximately 20/400, while enabling the pupil and iris of the wearer's eye to be visible through the lens.

References Cited

UNITED STATES PATENTS

| | | |
|---|---|---|
| 3,145,264 | 8/1964 | Schulz. |
| 1,627,892 | 5/1927 | Frederick _____ 350—188 |
| 2,055,696 | 9/1936 | Marshall _____ 350—188 X |
| 2,275,602 | 3/1942 | Beck et al. _____ 350—188 X |
| 2,770,164 | 11/1956 | Olmsted et al. _____ 351—159 |
| 3,383,676 | 5/1968 | Nagel _____ 350—167 X |

OTHER REFERENCES

Obrig: "Contact Lenses," textbook published in 1957, 3rd ed., pp. 198 and 199.

Charnwood: "Contact Occluders," article in The Optician, Apr. 3, 1953, pp. 271 and 274.

DAVID H. RUBIN, Primary Examiner

U.S. Cl. X.R.

350—167